United States Patent
Zhang et al.

(12)

(10) Patent No.: US 6,497,342 B2
(45) Date of Patent: Dec. 24, 2002

(54) MEDICINE FEEDER

(75) Inventors: Bin Zhang, Pittsburgh, PA (US);
Manoj K. Wangu, Wexford, PA (US)

(73) Assignee: McKesson Automated Healthcare, Inc., Pittsburgh, PA (US)

(*) Notice: Subject to any disclaimer, the term of this patent is extended or adjusted under 35 U.S.C. 154(b) by 230 days.

(21) Appl. No.: 09/726,855

(22) Filed: Nov. 30, 2000

(65) Prior Publication Data

US 2002/0096535 A1 Jul. 25, 2002

(51) Int. Cl.[7] .............................................. B65G 59/00
(52) U.S. Cl. ................................... 221/265; 221/121
(58) Field of Search ................................ 221/121, 122, 221/119, 258, 265, 264, 263

(56) References Cited

U.S. PATENT DOCUMENTS

| | | | |
|---|---|---|---|
| 3,064,406 A | | 11/1962 | Kennedy et al. |
| 3,991,908 A | * | 11/1976 | Thomas et al. ............ 221/154 |
| 4,094,439 A | * | 6/1978 | List ............................... 221/9 |
| 4,782,980 A | * | 11/1988 | Heimlich et al. ........... 221/265 |
| 4,785,969 A | | 11/1988 | McLaughlin |
| 4,903,861 A | * | 2/1990 | Yuyama ...................... 221/265 |
| 5,127,544 A | * | 7/1992 | Robinson et al. ............ 221/93 |
| 5,219,095 A | * | 6/1993 | Shimizu et al. ............. 221/264 |
| 5,322,185 A | * | 6/1994 | Leight ........................... 221/2 |
| 5,323,929 A | * | 6/1994 | Marlar ........................... 221/3 |
| 5,459,983 A | * | 10/1995 | Sadek et al. ................. 53/560 |
| 5,520,307 A | * | 5/1996 | Miller et al. ................... 221/2 |
| 5,755,357 A | * | 5/1998 | Orkin et al. ................. 221/82 |
| 5,787,678 A | * | 8/1998 | Koike et al. ................. 53/154 |
| 5,791,515 A | * | 8/1998 | Khan et al. ................. 221/154 |
| 5,803,309 A | * | 9/1998 | Yuyama et al. ............... 221/82 |
| 5,881,721 A | * | 3/1999 | Bunce et al. .......... 128/203.21 |
| 5,927,546 A | * | 7/1999 | Yuyama et al. ............. 221/265 |
| 5,984,079 A | * | 11/1999 | Garcia .................... 198/397.02 |
| 6,241,120 B1 | * | 6/2001 | Scholey et al. ............. 221/186 |
| 6,256,963 B1 | * | 7/2001 | Kim ............................ 53/155 |

FOREIGN PATENT DOCUMENTS

| | | |
|---|---|---|
| EP | 0 354 633 | 2/1990 |
| EP | 0 388 361 | 9/1990 |
| FR | 2 754 516 | 4/1998 |
| JP | 01254502 A2 | 11/1989 |
| JP | 02205523 A2 | 8/1990 |
| JP | 03200502 A2 | 2/1991 |
| JP | 06034620 A2 | 10/1994 |

* cited by examiner

Primary Examiner—Christopher P. Ellis
Assistant Examiner—Rashmi Sharma
(74) Attorney, Agent, or Firm—Buchanan Ingersoll, P.C.

(57) ABSTRACT

A unit dose medicine feeder for use in a packaging machine that can receive pills individually from a reservoir has a cylindrical housing having a base with an opening through which a pill may pass. There is a wheel-like component on the base that has a plurality of slots about its outer periphery. The slots are sized to receive a single pill in the form of a tablet, capsule or caplet and are oriented to have walls that are 10° to 45° from vertical. A gear mechanism is provided to connect the wheel-like component to a motor to rotate the wheel-like component. That rotation will sequentially align the slots with the opening in the base allowing a pill within the slot to pass from the slot through the opening. The orientation of the slots enables the wheel to receive a wider range of pill sizes without jamming and without dispensing more than one unit from a slot. Preferably there is a trap door in the medicine feeder that directs a dispensed pill directly to packaging material in a packaging machine.

20 Claims, 4 Drawing Sheets

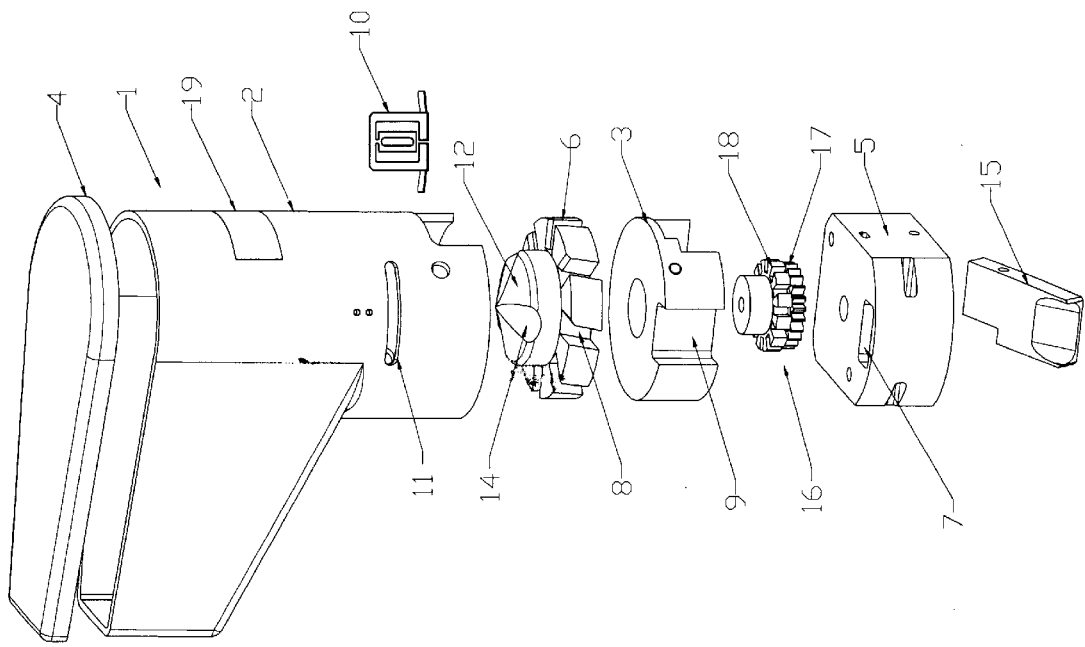
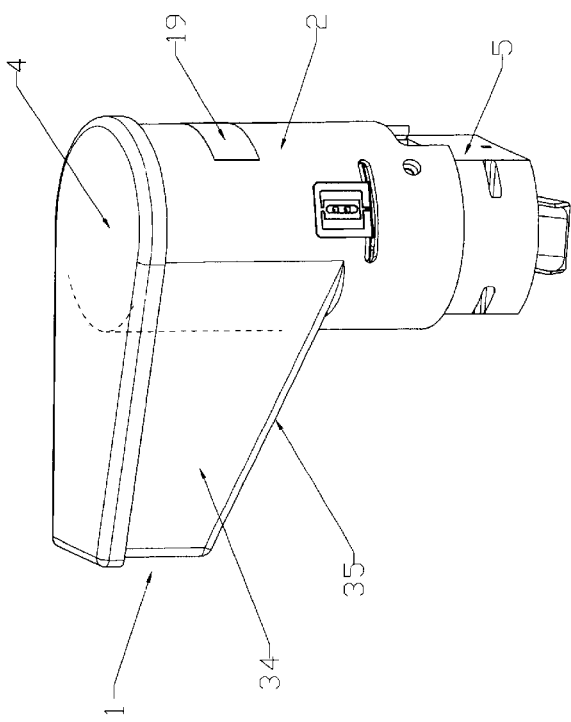

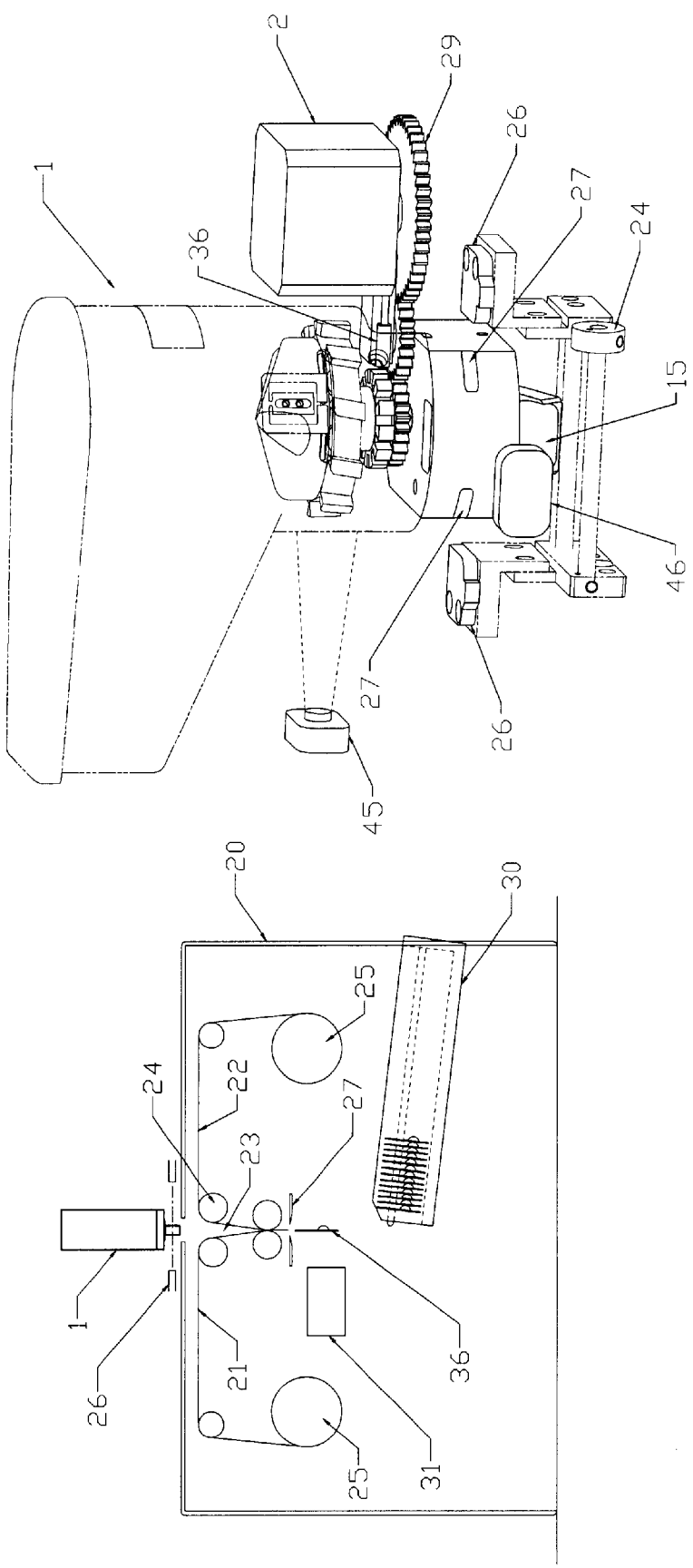

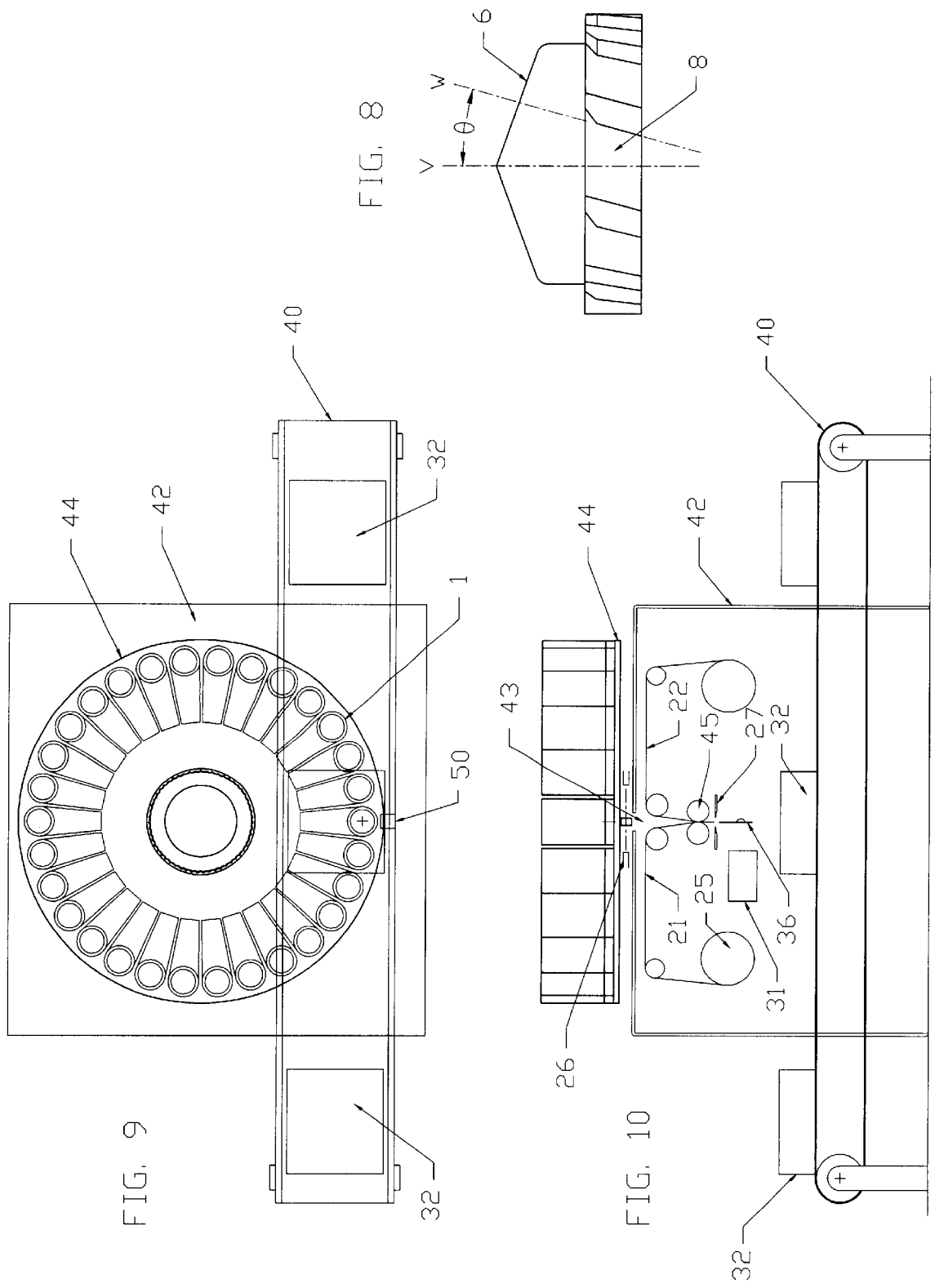

MEDICINE FEEDER

BACKGROUND OF THE INVENTION

The present invention relates to a device for continuously feeding tablets, capsules or caplets one by one into a packaging device.

There are several devices that have been used to individually dispense tablets, capsules or caplets from a bulk storage container. One common approach is to provide a turnstile that rotates to transport the tablets, capsules or caplets from a reservoir to an exit port. This type of mechanism has been used in hand-held medicine dispensers as well as in medicine packaging machines. U.S. Pat. No. 4,782,980 to Heimlich et al. and U.S. Pat. No. 5,791,515 to Kahn et al. disclose hand-held medicine dispensers that use turnstile mechanisms. U.S. Pat. No. 4,903,861 to Yuyama discloses another medicine feeder that uses a turnstile mechanism. Sadek et al. in U.S. Pat. No. 5,459,983 disclose a tablet enrobing apparatus in which a turnstile mechanism is used to feed individual tablets into a packaging strip.

Several problems have been encountered in using turnstile mechanisms to dispense tablets. Two important problems are jamming and dispensing more than one tablet from a single cavity. To some extent these problems can be solved by sizing the cavities of the turnstile to be only slightly larger than the tablet being dispensed. Yet, choosing that solution means that each turnstile can only be used for tablets of a single size or perhaps tablets within a very narrow size range.

About 80% of the medicines used in today's hospitals are in solid form, namely, tablets, capsules or caplets. Some drugs are available in different dosage amounts. Ibuprofen, for example, is available in 200 mg. tablets and 500 mg. tablets. Health care providers often call each unit dose a "med" while many patients call them pills. Thus, a hospital pharmacy would stock two different "meds" of ibuprofen. Additionally, each med could be available from multiple manufacturers. For example, forty drug companies manufacture ibuprofen. These manufacturers may make the same med (e.g. 200 mg. Ibuprofen tablet) in different sizes and forms. Each med made by a manufacturer has a unique drug code, called the National Drug Code or NDC in the United States and the Drug Identification Number or DIN in Canada. Currently, there are over 12,000 unique drug codes for tablets, capsule and caplet forms of medicine. The tablets can have a diameter of from 0.150 inches to 0.710 inches (3.81 mm to 18.03 mm) and a thickness of from 0.064 inches to 0.590 inches (1.63 mm to 14.99 mm). Baker APS currently offers a medicine feeder that has interchangeable dials that operate as turnstiles. The Baker APS device requires 1,000 dials to be able to dispense 10,000 unique drug codes. A user must determine the dimensions of the NDC unit (e.g. diameter and thickness of the tablet) to be dispensed and then select the dial assigned to that size of unit. Although the device works well, the need to purchase and store large numbers of dials is costly. Thus, there is a need for a reliable medicine feeder that can dispense a large number of different meds from multiple manufacturers without requiring thousands of different turnstiles.

Although there are over 12,000 different drug codes that cover the 880 medications currently available in tablet, capsule and caplet form, most hospitals carry only a few thousand NDC units. However, we have learned that about a fourth of these medications are not used regularly and only about 30 medicines account for 30% of the demand for tablets, capsules and caplets. But, since each of the popular meds may be made by several manufacturers, there are about 800 NDC numbers that correspond to these most popular meds. The top 100 tablets, capsules and caplets are represented by about 1100 NDC codes and the top 300 such products have about 2,000 NDC codes. Consequently, a medicine feeder that can dispense individual units of about 2,000 NDC units, or even the most popular meds from multiple manufacturers rapidly, and without jamming while requiring only 200 or fewer interchangeable turnstiles rather than 2,000 such mechanisms would represent a significant advance in the art.

The current medicine dispensing machines that can feed and package more than one med have multiple feeders, each containing a different med. But, there is a common passage through which all meds pass when traveling from the feeders to the package. Small particles sometimes break off one med traveling through the common passageway as fragments or powder and can adhere to another med subsequently passing through the same passageway causing contamination. Thus, there is a need for a machine feeder in which meds can be delivered from their bulk container to a package without becoming contaminated.

Another problem that can occur in packaging solid forms of medicine is that tablets, capsules and caplets sometimes break into several pieces. The feeder should be able to detect when a fragment is present and divert the fragment away from the packaging line or remove packages containing a fragment. This is particularly important when the medicine is being packaged in unit dose packages.

SUMMARY OF THE INVENTION

We provide a unit dose medicine feeder that can dispense tablets, capsules and caplets individually from a reservoir. This feeder has a housing that is on a base that defines a reservoir or chamber. The base has an opening through which tablets, capsules and caplets may pass. There is a wheel-like component, called an indexer wheel, on the base that has a plurality of slots about its outer periphery. The slots are sized to receive a single tablet, capsule or caplet and are oriented so that the wall of the slot is from 10° to 45° away from vertical. A gear mechanism is provided to connect the indexer wheel to an electric motor such as a stepper motor having position feed back capability. This motor rotates the wheel-like component. That rotation will sequentially align the slots with the opening in the base allowing a tablet, capsule or caplet within the slot to pass from the slot through the opening. A retainer is attached to the wall of the housing, opposite the opening in the base and adjacent the top of the wheel. The retainer covers that slot which is aligned over the opening. The orientation of the slots enables the wheel to receive a wider range of tablets, capsules and caplets without jamming and without dispensing more than one unit from a slot.

We further prefer to connect the electric motor to the indexer wheel through a coupling having a ring gear that is driven by the motor and a position ring with slots on it. The position ring is adjacent the ring gear and turns with the ring rear. A sensor is provided opposite the position ring to sense the rotation of the indexer wheel. When a jam is sensed the motor reverses direction to clear the jam. The motor may run through a few steps to allow the jam to clear then resume the original rotation. Alternatively, the motor may continue in that opposite direction until another jam occurs and then reverse direction to clear the jam.

The feeder also has a gate or trap door that directs the med leaving the feeder directly into the package. Hence, there is no need for a chute to be positioned above the package. Since each feeder has a gate that allows for dropping the med directly into the package, the common chute and the associated contamination can be eliminated.

A sensor is preferably provided at the bottom of the feeder to detect the med as it passes from the indexer wheel toward the gate. The sensor tells the control system or operator when a tablet, capsule or caplet has been dispensed. Additionally, the sensor can be configured and positioned to also detect when a fragment has been dispensed. Then steps can be taken to remove the fragment or remove a package containing the fragment.

A machine vision system can be placed near or incorporated into the feeder to take an image of the medicine being dispensed. That image can then be compared to a reference image to positively identify the medicine being dispensed.

We have found this dispenser to be very reliable in not dispensing multiple units from a slot and in not presenting empty slots to the openings in the base.

Other objects and advantages of the medicine feeder will become apparent from certain present preferred embodiments thereof that are shown the drawings.

BRIEF DESCRIPTION OF THE FIGURES

FIG. 1 is a perspective view of a present preferred embodiment of our medicine feeder with an optional cylindrical configuration indicated by dotted lines.

FIG. 2 is and exploded view of the embodiment of FIG. 1.

FIG. 6 is a side view of the embodiment of FIG. 1 positioned over a packager.

FIG. 7 is a perspective view similar to FIG. 1 showing an electric motor engaged with the feeder and a portion of a packaging machine shown in dotted line.

FIG. 8 is a side view of the wheel-like component or indexer that has slots for individual tablets, capsules or caplets.

FIG. 9 is a top view of a packaging machine that utilizes 30 feeders of the type shown in FIGS. 1 through 5.

FIG. 10 is a side view of the packaging machine of FIG. 9.

DESCRIPTION OF THE PREFERRED EMBODIMENTS

Figure 3:
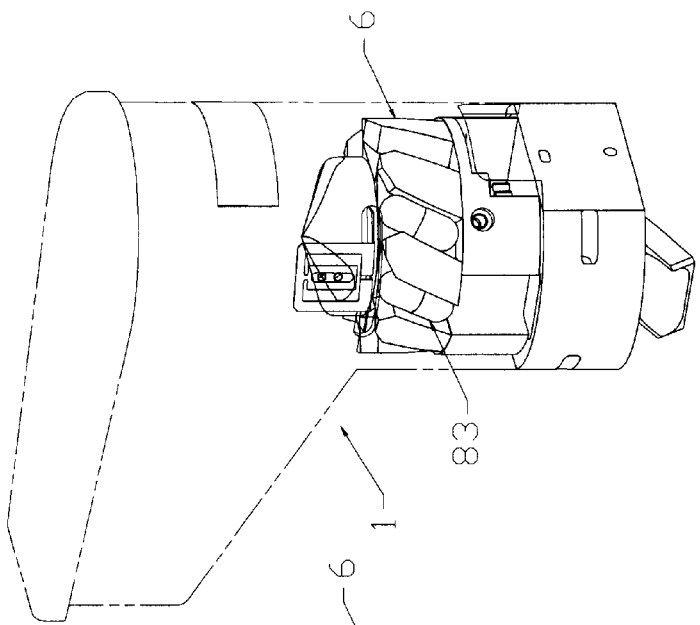
FIG. 3 is a perspective view similar to FIG. 1 of a feeder for tablets with the housing shown in chain line.
Figure 4:
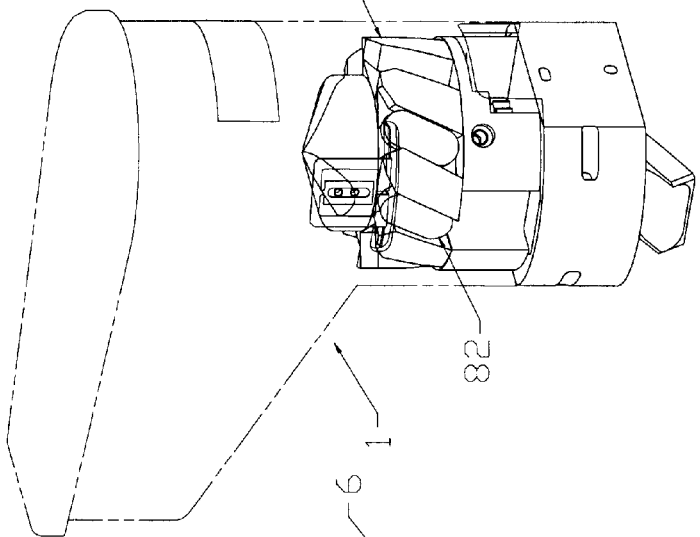
FIG. 4 is a perspective view similar to FIG. 1 of a feeder for caplets with the housing shown in chain line.
Figure 5:
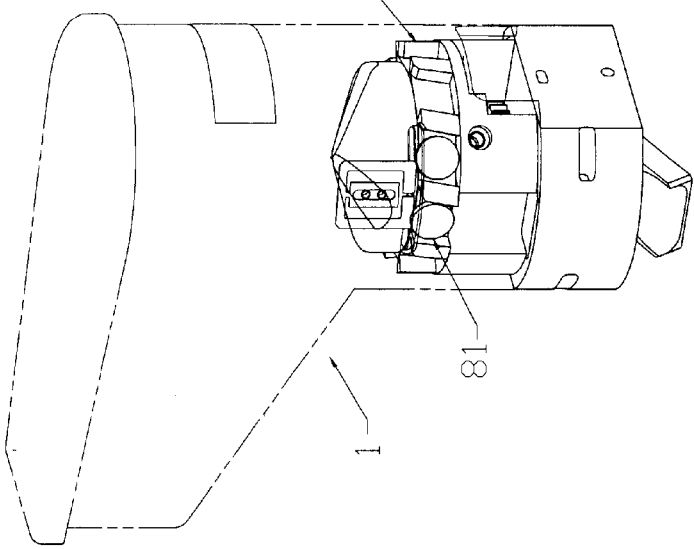
FIG. 5 is a perspective view similar to FIG. 1 of a feeder for capsules with the housing shown in chain line.

Referring to FIGS. 1 and 2, a first preferred embodiment of our medicine feeder has a housing 2 mounted on a base 3 and having a removable cover 4. The walls of the housing 2 define a chamber or reservoir. The base 3 is carried on a mount 5 for a gate or trap door 15. Within the housing 2 there is an indexer 6 which is a wheel-like component having a series of slots 8 about its outer periphery. The slots are sized to receive a tablet 81, capsule 82 or caplet 83 shown in FIGS. 3, 4 and 5 respectively. The indexer 6 sits on the base 3. There is a slot 9 that passes through the base 3 and is positioned to be aligned with an opening 7 in the trap door mount 5 and with the outer periphery of the indexer wheel 6 having slots 8. The indexer 6 is attached to a coupling 16 that has a ring gear 17 and a position ring 18 with slots or other markings. This coupling can be a single molded plastic part. An electric motor 28 shown in FIG. 7 turns the ring gear 17 through a gear train 29. When the feeder is in a desired location for dispensing, gear train 29 engages the ring gear 17. The electric motor turns the gear train 29 and the engaged coupling 16 causing the indexer wheel to rotate. We further provide a retainer 10 on the wall of the housing 2 above the slot 9 in the base to cover that slot of the indexer wheel which is over the slot 9 in the base. The retainer fits into slot 11 in the housing 2. A conical portion 12 is provided at the center of the indexer 6 to divert tablets, capsules or caplets toward the slot in the outer periphery of the indexer. There are three depressions 14 in the conical portion 12. These depressions enable the top surface of the conical portion to agitate the meds in the feeder as the indexer wheel turns so that they will move toward the slots in the indexer wheel. The same function could be accomplished with a raised bar or other projection extending from the top surface of the conical portion 12.

The housing 2 of the medicine feeder could be a cylinder as indicated by the dotted lines in FIG. 1. However, we prefer that the housing have an upper reservoir portion 34. This upper reservoir portion has a sloped base 35 to direct NDC units or pills in the upper reservoir portion 34 toward the indexer 6. This configuration holds more tablets, capsules or caplets than a cylindrical housing of the same height. In a cylindrical housing having a comparable volume there would be a greater downward force of the contents on the indexer wheel than occurs in the embodiment with the upper reservoir. A label 19 containing a bar code preferably is placed on the side of the medicine feeder to identify the feeder and its contents.

Our medicine feeder is particularly useful with a packaging machine 20 that places a wrapper around individual units. As can be seen in FIG. 6, the feeder 1 is positioned so that the slot 9 in the base 3 and the opening 7 in the trap door mount 5 are above the envelope 23 formed by the packaging material. The trap door 15 directs each tablet, capsule or caplet between the strips of paper, foil, cellophane or other packaging material 21 and 22 from rolls 24. After each tablet passes to a position between opposite portions of strips 21 and 22 that are carried on wheels 24 a die (not shown) closes sealing the packaging material around the tablet. The sealed tablet is advanced and a cutter 27 cuts away a unit dose package 36. That package could be directed to a stacker 30 or into a container 32 as shown in FIG. 10. A printer 31 applies a bar code and possibly other information to the package before or while it is being cut away. As shown in FIGS. 6 and 7 sensors 26 are provided adjacent the trap door mount 5. The sensors direct light beams through the slots 27 in the trap door mount 5. As each tablet passes through the light beams the sensors detect its passage. Then a signal is given to the packager that a tablet has been dispensed. This signal could initiate the opening of the trap door 15. We prefer to use a sensor of the type that directs a series of parallel beams through the slots 27 and detects which of the beams has been interrupted at repeated short time intervals such as a millisecond. As the tablet passes through the light beams such sensors produce a series of signals that will identify the size and shape of the object passing through the light beams. Consequently, we are able to detect when fragments have been dispensed and take appropriate action. One such sensor is available from Keyence Corporation of America and sold under the designations FU-38V and FU-38R.

Referring to the FIGS. 3, 4, 5, 7 and 8 we have discovered that jamming can be prevented and a wider range of sizes of tablets, capsules and caplets can be handled by a single indexer when the slots are angled so that the walls of the slots 8 are at an angle θ of from 10° to 45°, and preferably from 20° to 40° from vertical, as indicated by dotted lines V and W in FIG. 8. We prefer to rotate the indexer in the direction of the slope of the centerline. Thus, the indexer in the embodiments shown in the Figures would be rotated clockwise. A jam is detected by a sensor 36 shown in FIG. 7 positioned opposite the position ring 18 in coupling 16. Since the position ring has slots the sensor 36 is able to determine if the coupling is turning. If the coupling is not turning while the motor is on, then a jam has occurred. When a jam occurs the electric motor reverses direction and the indexer is rotated in an opposite direction to clear the jam. That direction is counterclockwise for the embodiments shown in the figures.

The dimensions of the slots as well as the size of the housing and indexer may vary according to the diameter and thickness of the tablet, capsule or caplet, collectively called pills. We have developed sizing charts for the top 100 tablet drugs, top 200 tablet drugs and all tablet drugs in which the pills are classified by diameter and thickness. Tables 1, 2 and 3 report those results.

TABLE 1

Indexer Wheels for Tables (Multiple NDC's) within Top 100 Frequently Used Medications (Oral Solids All forms)

| Diameter Range inch (mm) | Thickness Range, inch (mm) | | | | | | | | number of indexer wheels for this row |
|---|---|---|---|---|---|---|---|---|---|
| | (1) 0.064 (1.63) 0.080 (2.03) | (2) 0.080 (2.03) 0.100 (2.54) | (3) 0.100 (2.54) 0.125 (3.17) | (4) 0.125 (3.17) 0.156 (3.96) | (5) 0.156 (3.96) 0.195 (4.95) | (6) 0.195 (4.95) 0.243 (6.17) | (7) 0.243 (6.17) 0.303 (7.69) | (8) 0.303 (7.69) 0.378 (9.60) | |
| (T1) 0.150 (3.81) 0.187 (4.75) | | | | | | | | | |
| (T2) 0.187 (4.75) 0.233 (5.92) | | 17 | 7 | | | | | | 2 |
| (T3) 0.233 (5.92) 0.291 (7.39) | | 29 | 50 | 36 | 5 | | | | 4 |
| (T4) 0.291 (7.39) 0.364 (9.25) | | 15 | 52 | 92 | 91 | 18 | | | 5 |
| (T5) 0.364 (9.25) 0.455 (11.56) | | | 10 | 37 | 54 | 48 | | | 4 |
| (T6) 0.455 (11.56) 0.568 (14.42) | | | | | 29 | 21 | 7 | 2 | 4 |
| (T7) 0.568 (14.42) 0.710 (18.03) | | | | | | | | | |
| Total Number of Indexer Wheels Needed to Feed the Top 100 Frequently Used Tablet Form Medications | | | | | | | | | 19 |

TABLE 2

Indexer Wheels for Tables (Multiple NDC's) within Top 200 Frequently Used Medications (Oral Solids All forms)

| Diameter Range inch (mm) | Thickness Range, inch (mm) | | | | | | | | number of indexer wheels for this row |
|---|---|---|---|---|---|---|---|---|---|
| | (1) 0.064 (1.63) 0.080 (2.03) | (2) 0.080 (2.03) 0.100 (2.54) | (3) 0.100 (2.54) 0.125 (3.17) | (4) 0.125 (3.17) 0.156 (3.96) | (5) 0.156 (3.96) 0.195 (4.95) | (6) 0.195 (4.95) 0.243 (6.17) | (7) 0.243 (6.17) 0.303 (7.69) | (8) 0.303 (7.69) 0.378 (9.60) | |
| (T1) 0.150 (3.81) 0.187 (4.75) | | | | | | | | | |
| (T2) 0.187 (4.75) | | 48 | 14 | | | | | | 2 |

TABLE 2-continued

Indexer Wheels for Tables (Multiple NDC's) within Top 200 Frequently Used Medications (Oral Solids All forms)

| Diameter Range inch (mm) | Thickness Range, inch (mm) | | | | | | | | number of indexer wheels for this row |
|---|---|---|---|---|---|---|---|---|---|
| | (1) 0.064 (1.63) 0.080 (2.03) | (2) 0.080 (2.03) 0.100 (2.54) | (3) 0.100 (2.54) 0.125 (3.17) | (4) 0.125 (3.17) 0.156 (3.96) | (5) 0.156 (3.96) 0.195 (4.95) | (6) 0.195 (4.95) 0.243 (6.17) | (7) 0.243 (6.17) 0.303 (7.69) | (8) 0.303 (7.69) 0.378 (9.60) | |
| 0.233 (5.92) 0.233 (5.92) (T3) | 12 | 65 | 87 | 91 | 9 | | | | 5 |
| 0.291 (7.39) 0.291 (7.39) (T4) | | 35 | 80 | 179 | 129 | 27 | | | 5 |
| 0.364 (9.25) 0.364 (9.25) (T5) | | | 16 | 69 | 137 | 100 | 4 | | 5 |
| 0.455 (11.56) 0.455 (11.56) (T6) | | | | | 29 | 35 | 24 | 10 | 4 |
| 0.568 (14.42) 0.568 (14.42) (T7) 0.710 (18.03) | | | | | | | | | |
| Total Number of Indexer Wheels Needed to Feed the Top 200 Frequently Used Tablet Form Medications | | | | | | | | | 21 |

TABLE 3

| | Medication (oral solids) Ranked by Usage | | | |
|---|---|---|---|---|
| Drug Shape | Top 100 | Top 200 | Top 300 | All Ranges |
| Tablet | 19 | 21 | 21 | 38 |
| Capsule & Oblong and Football (with thick/width < 75%) | 22 | 24 | 27 | 54 |
| Oblong and Football (with thick/width < 75%) | 13 | 14 | 20 | 48 |
| Number of Indexer Wheel Needed | 54 | 59 | 68 | 140 |

We provide an indexer for each cell or category in the table. The indexer will have a slot width in the radial direction of the indexer that is slightly larger than the highest thickness number in the Thickness Range corresponding to the category. We prefer the slot widths to be 1.05 times the maximum thickness. The depth of the slot will be equal to or slightly larger than the highest number for the Diameter Range corresponding to the category. The width of the slot in the circumferential direction should be slightly larger than (e.g. 1.05 times) the highest diameter in the diameter range. Consequently, an indexer with slots having a diameter of 0.16 inches (4.06 mm.) and being 0.37 inches (9.4 mm.) deep would be used for the 92 meds in Table 1 that are within the category of 0.125 to 0.156 inches thick and 0.291 to 0.364 inches in diameter. Since each category in the tables corresponds to a single indexer wheel, our medicine feeder can distribute the top 100 tablet drugs using 19 different indexer wheels, the top 200 tablet drugs using 21 indexer wheels, and all tablet drugs using 38 indexer wheels. Furthermore, the medicine feeder disclosed here will require only 140 different indexes wheels to distribute all forms of solid medication administered orally The medicine feeders disclosed here are particularly useful for packaging machines that wrap individual pills between two layers of packaging material as described above with reference to FIG. 6. Furthermore, several of these medicine feeders can be carried in a carousel within a packaging machine such as is illustrated in FIGS. 9 and 10.

The packaging and delivery machine shown in FIGS. 9 and 10 is particularly useful for packaging pills prescribed for a specific patient or location (such as a cabinet at a nursing station) in a hospital or nursing home. In those facilities there is a container assigned to each individual patient or to specific locations within a cabinet on a patient floor. The container may be a drawer, a bin or an envelope. In the machine of FIGS. 9 and 10, there is a conveyer 40 on which the patient bins are placed. The conveyer directs the bin 32 for a selected patient to a position below a packager 42 at which a unit dose medicine package 36 is dropped. There is a carousel 44 on top of the packager 42 that contains up to thirty medicine feeders 1. Although FIG. 9 contains medicine feeders of the type shown in FIG. 1, one could use cylindrical medicine feeders. Each feeder contains many units of a single med and is bar coded or assigned a particular location in the carousel. Consequently, the operator of the packager, either a technician or a computer, can look at an order of meds for a particular patient whose bin is under the packager 42 and identify the medicine feeders containing those meds. Once those feeders have been identified the carousel is turned to position the first of those medicine feeders over the opening 43 in packager 42 that leads to the packaging material 21, 22. The indexer in the medicine feeder is then turned to dispense the prescribed number of NDC units or pills. Each pill drops between strips of packaging material 21, 22. A sensor 26 detects each falling pill. A die or rollers 45 conform the packaging around the pill to form a unit dose medicine package 36. Sealing and cutting unit 47 makes a transverse seal in the packaging material. A blade in that unit cuts through the seal so that the top of the filled package and the bottom of the open package above it are sealed. Before the package 36 is cut away, a printer 31 applies a bar code and possibly other information to the package 36. Then the package 36 drops into the patient bin 32. This process is repeated until all prescribed meds for that patient have been packaged and deposited into the patient bin. Although the drawings show the printer positioned to print the packaging material near the cutter, printing could be done earlier. For example, the packaging material could be preprinted, printed as it leaves the Toll 25 or printed immediately before it passes over wheel 24.

Many, if not most, tablets, capsules and caplets are imprinted or embossed with the name of the manufacturer or a product name, code or number. Consequently, we can provide a camera or other machine vision sensor 45 or 46 shown in FIG. 7 to take an image of the pill before it leaves the feeder. This image can then be compared with a file image of the pill believed to be in the feeder or with a set of images of all pills that could be in the feeder. From a comparison of the recent image to one or more file images a computer can identify the pill being dispensed. In FIG. 7 one sensor 45 is positioned to take an image when the pill is in the indexer wheel and a second sensor 46 is positioned to take an image as the pill is being dispensed. In most applications only one of the two sensors should be sufficient.

Since the packaging machine shown in FIGS. 9 and 10 carries only thirty medicine feeders, it cannot store all 12,000 meds carried by a hospital pharmacy. Rather, it is intended to carry the thirty most frequently dispensed meds. A hospital may have additional carousels and feeders containing other meds that can easily replace those on the packaging machine.

The patient containers and medicine feeders all carry labels preferably containing bar codes. We prefer to provide a bar code reader 50 at the dispensing location identified by the plus sign in FIG. 9 to identify the medicine feeder before units are dispensed. Another bar code reader (not shown) reads the bar code on the patient bin before the bin enters the packager or while it is within the packager. Then a computer confirms that the pill about to be dispensed is intended for the patient whose bin is in the packager. After confirmation is made the pill s dispensed.

The packaging machine illustrated in FIGS. 9 and 10 can be used in combination with the robotic system disclosed by McDonald et al. in U.S. Pat. No. 5,468,110. When so used, the packager could be used to supply some of the prescribed meds for a selected patient while the robot could deliver other meds not in the packager. Furthermore, a hospital or nursing home pharmacy may have two or more packagers along a conveyer. Then some meds could be provided to the patient bin by the first packager and others provided by subsequent packagers.

The packaging machine shown in FIGS. 9 and 10 enables the rapid packaging of unit dose medicine with very little risk of mistake or contamination. Furthermore, the machine accurately identifies and counts each med distributed to a particular patient This information is important not only for quality control but also for patient billing. Should some packages be returned to the pharmacy because the patient has been discharged or for any other reason, the bar code on the package can be used to readily identify what was returned and credit the patient's account for the return.

Although we have described and illustrated certain present preferred embodiments of our medicine feeder, it should be distinctly understood that our invention is not limited thereto, but may be variously embodied within the scope of the following claims.

We claim:

1. A unit dose medicine feeder comprising:
   a. a housing having a base and a wall extending from the base and defining a reservoir for holding pills, the base having an outer periphery and an opening located along the outer periphery, the opening sized to allow at least one pill selected from the group consisting of tablets, capsules and caplets to pass through the opening;
   b. a wheel-like component having a top surface, a bottom surface which is adjacent the base of the cylindrical housing, an outer periphery and a plurality of elongated slots around the outer periphery, each slot oriented to have a center line that is parallel to the wall of the cylindrical housing and from 10° to 45° from vertical, the slots sized to receive a single pill selected from the group consisting of tablets, capsules and caplets, the slots being positioned so that as the wheel-like component is rotated the slots will sequentially become aligned with the opening in the base allowing a pill within the slot to pass from the slot through the opening,
   c. a coupling attached to the wheel-like component and configured for connection to a motor for rotating the wheel-like component relative to the base, and
   d. a retainer attached to the wall of the housing, the retainer positioned opposite from the opening in the base and adjacent the top of the wheel like member, the retainer sized to cover a slot in the wheel-like member when that slot is aligned with the opening in the base.

2. The unit dose medicine feeder of claim 1 also comprising a chute attached to the base adjacent the opening in the base.

3. The unit dose medicine feeder of claim 1 wherein the slots have a width of at least 0.25 inches.

4. The unit dose medicine feeder of claim 1 also comprising a removable cover attached to the cylindrical housing at an end opposite the base.

5. The unit dose medicine feeder of claim 1 wherein at least a portion of the top surface of the wheel-like member is conical.

6. The unit dose medicine feeder of claim 1 wherein the coupling has position ring having one of slots and markings.

7. The unit dose medicine feeder of claim 1 wherein the housing is cylindrical.

8. The unit dose medicine feeder of claim 1 wherein the housing has a cylindrical portion and an upper reservoir portion having a sloped bottom and extending from the cylindrical portion.

9. The unit dose medicine feeder of claim 1 also comprising a sensor positioned near the opening in the base and capable of detecting pills passing through the opening.

10. The unit dose medicine feeder of claim 9 wherein the sensor is able to detect fragments passing through the opening.

11. The unit dose medicine feeder of claim 1 also comprising an imager positioned adjacent the feeder so that the imager can create an image of a pill positioned in or being dispensed from the feeder.

12. An improved unit dose medicine packaging machine of the type in which a medicine feeder containing pills is positioned above packaging material that is sealed around each dispensed pill, the improvement comprising the medicine feeder comprising:

a. a housing having a base and a wall extending from the base defining a reservoir for holding pills, the base having an outer periphery and an opening located along the outer periphery, the opening sized to allow at least one pill selected from the group consisting of tablets, capsules and caplets to pass through the opening;
   b. a wheel-like component having a top surface, a bottom surface which is adjacent the base of the cylindrical housing an outer periphery and a plurality of elongated slots around the outer periphery, each slot oriented to have a center line that is parallel to the wall of the cylindrical housing and from 10° to 45° from vertical, the slots sized to receive a single pill selected from the group consisting of tablets, capsules and caplets, the slots being positioned so that as the wheel-like component is rotated the slots will sequentially become aligned with the opening in the base allowing a pill within the slot to pass from the slot through the opening;
   c. a coupled attached to the wheel-like component and configured for connection to a motor for rotating the wheel-like component relative to the base; and
   d. a retainer attached to the wall of the housing, the retainer positioned opposite from the opening in the base and adjacent the top of the wheel like member, the retainer sized to cover a slot in the wheel-like member when that slot is aligned with the opening in the base; and
   e. a motor connected to the coupling.

13. The improved unit dose medicine packaging machine of claim 12 also comprising a carousel on which the medicine feeder is carried.

14. The improved unit dose medicine packaging machine of claim 12 also comprising:

a. a bar code label on the medicine feeder; and
   b. a bar code reader positioned on the packaging machine to read the bar code label.

15. The improved unit dose medicine packaging machine of claim 12 wherein the packaging material is two strips of material sealed around each pill and cut into the unit dose packages.

16. The improved unit dose medicine packaging machine of claim 12 wherein the coupling has a position ring having slots or markings and also comprising a sensor attached to the packaging machine adjacent the position ring for determining if the coupling is turning.

17. The improved unit dose medicine packaging machine of claim 12 also comprising a sensor positioned near the opening in the base of the medicine feeder and capable of detecting pills passing through the opening.

18. The improved unit dose medicine packaging machine of claim 17 wherein the sensor is able to detect fragments passing through the opening.

19. The improved unit dose medicine packaging machine of claim 12 wherein there is no chute apart from the medicine feeder that directs pills from the machine feeder to the packaging material.

20. The improved unit dose medicine packaging machine of claim 12 also comprising an imager positioned adjacent the feeder so that the imager can create an image of a pill positioned in or being dispensed from the feeder.

* * * * *

UNITED STATES PATENT AND TRADEMARK OFFICE
CERTIFICATE OF CORRECTION

PATENT NO. : 6,497,342 B2
DATED : December 24, 2002
INVENTOR(S) : Zhang et al.

It is certified that error appears in the above-identified patent and that said Letters Patent is hereby corrected as shown below:

Title page,
Item [57], ABSTRACT, in the last sentence, after "Preferably", insert -- , --.

Column 3,
Line 2, delete "rear" and insert in its place -- gear --.
Line 35, after "shown" insert -- in --.
Line 40, delete "and" and insert in its place -- an --.

Column 7,
Line 54, delete "0.1 56" and insert in its place -- 0.156 --.
Line 62, delete "indexes" and insert in its place -- indexers --.

Column 9,
Line 6, delete "Toll" and insert in its place -- roll --.

Column 10,
Line 25, delete "opening," and insert in its place -- opening; --.
Line 28, delete "base," and insert in its place -- base; --.

Column 11,
Line 24, delete "coupled" and insert in its place -- coupling. --.

Signed and Sealed this

Twelfth Day of August, 2003

JAMES E. ROGAN
*Director of the United States Patent and Trademark Office*